(12) United States Patent
Fukuhara (10) Patent No.: US 6,170,972 B1
(45) Date of Patent: Jan. 9, 2001

(54) VEHICLE LAMP

(75) Inventor: Kiyoshi Fukuhara, Shizuoka (JP)

(73) Assignee: Koito Manufacturing Co., Ltd., Tokyo (JP)

( * ) Notice: Under 35 U.S.C. 154(b), the term of this patent shall be extended for 0 days.

(21) Appl. No.: 09/135,596

(22) Filed: Aug. 18, 1998

(30) Foreign Application Priority Data

Aug. 18, 1997 (JP) .................................................. 9-221537

(51) Int. Cl.[7] ........................................................ F21V 29/00
(52) U.S. Cl. .......................... 362/544; 362/507; 362/509; 362/520; 362/546; 362/360
(58) Field of Search ................................. 362/544, 520, 362/522, 543, 507, 546, 509, 521, 332, 360, 367

(56) References Cited

U.S. PATENT DOCUMENTS

| | | | |
|---|---|---|---|
| 5,172,972 | * 12/1992 | Terao | 362/543 |
| 5,552,969 | 9/1996 | Murakami | 362/61 |
| 5,658,072 | * 8/1997 | Natsume et al. | 362/521 |
| 5,692,824 | * 12/1997 | Ooishi | 362/80 |

* cited by examiner

Primary Examiner—Sandra O'Shea
Assistant Examiner—Bertrand Zeade
(74) Attorney, Agent, or Firm—Morgan, Lewis & Bockius LLP (57) ABSTRACT

A vehicle lamp comprising: a light source; a lamp body having a front opening portion thereof; and a front lens disposed in a front opening portion of a lamp body having a light source therein, wherein said front lens is a compound lens made from a plurality of lens bodies which are integrally formed by making joint between sectionally hook-shaped side edge portions which are bent toward the back surface sides of said respective lens bodies so that said compound lens has a continuous surface, a joint surface between said side edge portions being configured so as to be inclined with respect to a plane perpendicular to a lens surface line crossing a joint portion, said joint portion being constituted by an obtuse hook-shaped side edge portion in which said joint surface and said lens surface line form an obtuse angle therebetween, and an acute hook-shaped side edge portion in which said joint surface and said lens surface line form an acute angle therebetween, wherein an acute front edge portion of said acute hook-shaped side edge portion is chamfered substantially perpendicularly to said joint surface.

10 Claims, 5 Drawing Sheets

VEHICLE LAMP

BACKGROUND OF INVENTION

The present invention relates to a vehicle lamp having a front lens disposed in a front opening portion of a lamp body, the front lens of a compound lens comprising a plurality of lenses which are integrally molded such that their side edge portions are made to abut on each other. Particularly, the present invention relates to a front lens having such a structure that the joint surface between the lenses is inclined with respect to a plane perpendicular to a lens surface line crossing the joint portion.

Figure 4:
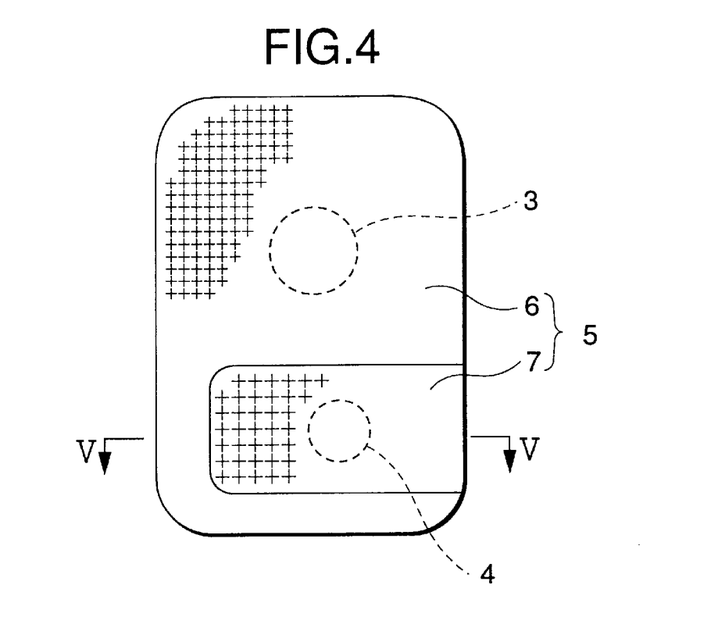
FIG. 4 is a front view of a conventional rear combination lamp.
Figure 5:
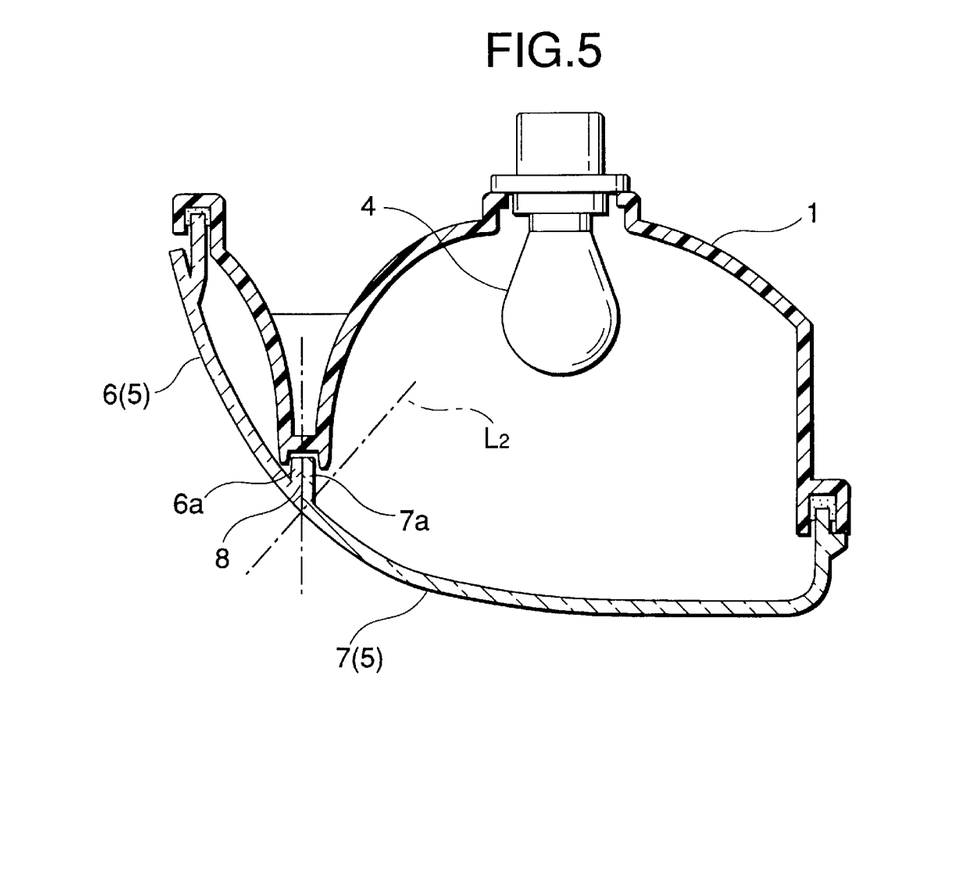
FIG. 5 is a horizontal sectional view of the conventional rear combination lamp (a sectional view taken on line V—V shown in FIG. 1)

FIGS. 4 and 5 show a rear combination lamp which will be attached to a corner portion of a vehicle body, and in which a tail and stop lamp and a backup lamp are integrated with each other. FIG. 4 is a front view of the same lamp, and FIG. 5 is a horizontal sectional view of the same lamp (sectional view taken on line V-V shown in FIG. 4).

In this lamp, lamp chambers corresponding to the tail and stop lamp and the backup lamp are defined in a lamp body 1. Bulbs 3 and 4 are received in the respective lamp chambers, while a front lens 5 is integrally attached to a front opening portion of the lamp body 1.

The front lens 5 is of a compound lens in which a red lens 6 for the tail and stop lamp and a white lens 7 for the backup lamp are molded integrally. The reference numerals 6a and 7a represent sectionally hook-shaped side edge portions bent toward the back surface side of the respective lenses 6 and 7. In the front lens 5, the lenses 6 and 7 are integrally molded in such a manner that the side edge portions 6a and 7a are joined in a condition that they are made to abut on each other. The reference numeral 8 represents a joint surface between the side edge portions 6a and 7a.

The lens 5 is molded as follows. After the red lens 6 is molded, a part of the mold is replaced by another mold for molding a white lens, and white lens 7 is thus molded. In such a manner, the front lens 5 in which the red lens 6 and the white lens 7 are integrated with each other is molded.

Figure 6:
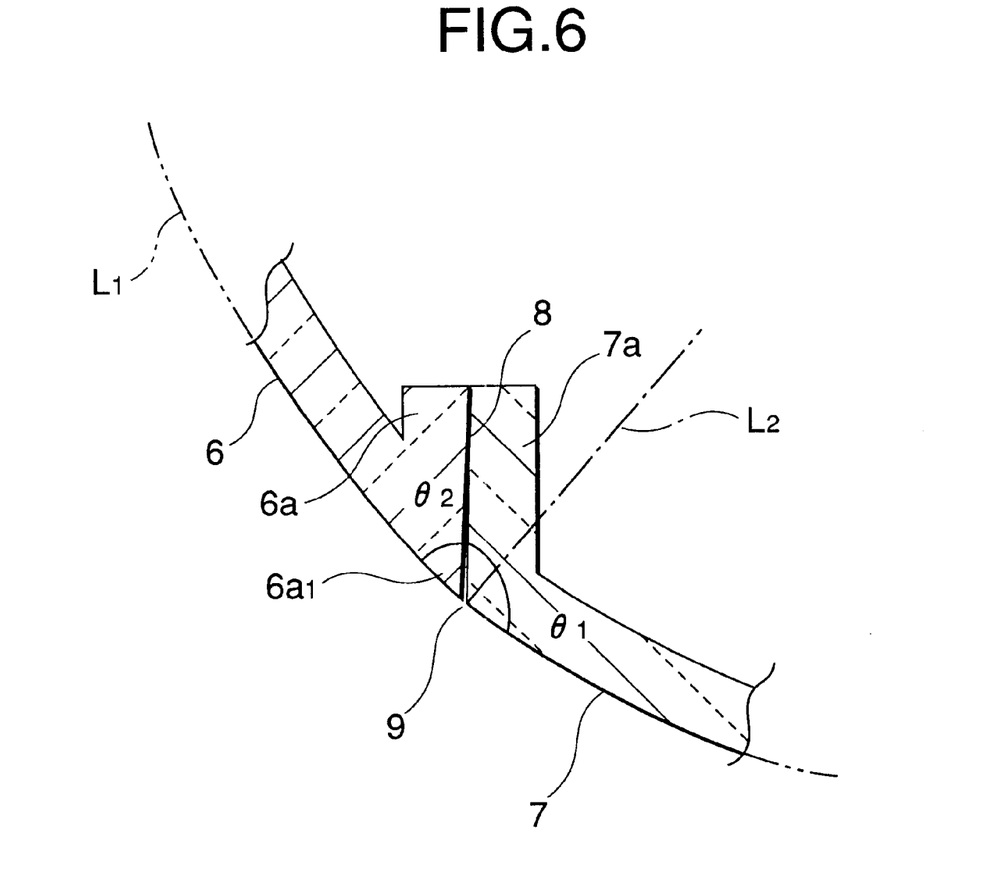
FIG. 6 is an enlarged sectional view of a joint portion between lenses.

However, since the front lens 5 is formed into a shape which is largely bent to a side of a vehicle body, the joint surface 8 between the sectionally hook-shaped side edge portions 6a and 7a constituting the joint portion of the lens is largely inclined with respect to a normal line $L_2$ to a lens surface curved line $L_1$ crossing the joint portion, as shown in the enlarged view of FIG. 6. Then, the joint portion of the lens has a structure constituted by the obtuse hook-shaped side edge portion 7a in which the joint surface and the lens surface line make an obtuse angle $\theta_1$, and the acute hook-shaped side edge portion 6a in which the joint surface and the lens surface line make an acute angle $\theta_2$.

Therefore, there is a fear that the mold is not sufficiently filled with resin up to the narrow portion of the mold corresponding to an acute front edge portion 6a, of the acute hook-shaped side edge portion 6a in a molding step of the front lens 5, particularly in a molding step of the red lens 6 molded previously. As a result, a gap 9 may be formed in the joint surface 8 between the side edge portions 6a and 7a in a molding step of the white lens in which the red lens is inserted. Accordingly, there arises a problem that the external appearance of the front lens is bad, or the gap 9 is enlarged so that water may enter a lamp chamber.

SUMMARY OF INVENTION

In view of the foregoing problems, it is an object of the present invention to provide a vehicle lamp having a compound lens in which joint surfaces of lenses are brought into tight contact with each other surely.

In order to achieve objects, there is provided with a vehicle lamp comprising: a light source; a lamp body having a front opening portion thereof; and a front lens disposed in a front opening portion of a lamp body having a light source therein, wherein said front lens is a compound lens made from a plurality of lens bodies which are integrally formed by forming a joint between sectionally hook-shaped side edge portions which are bent toward the back surface sides of the respective lens bodies so that the compound lens has a continuous surface, a joint surface between the side edge portions being configured so as to be inclined with respect to a plane perpendicular to a lens surface line crossing a joint portion, the joint portion being constituted by an obtuse hook-shaped side edge portion in which the joint surface and the lens surface line form an obtuse angle therebetween, and an acute hook-shaped side edge portion in which the joint surface and the lens surface line form an acute angle therebetween, wherein an acute front edge portion of the acute hook-shaped side edge portion is chamfered substantially perpendicularly to the joint surface. Since the acute front edge portion of the acute hook-shaped side edge portion is chamfered into a substantially right-angled front edge portion, a lens molding mold is filled with resin up to a portion corresponding to the front edge of the acute hook-shaped side edge portion surely. Accordingly, the joint surfaces of the hook-shaped side edge portions of the lenses molded integrally as a compound lens are brought into tight contact with each other without any gap.

In the above front lens for a vehicle, the lens surface line crossing the joint portion is an outward convexly curved line. Since the front lens as a whole is constituted by an outward convexly curved line, not only the lamp chambers are widen, but also a diffusion angle of light in the direction in which the lens surface line is extended is increased.

In the above vehicle lamp, the front lens is constituted by a plurality of lens bodies different in color from each other. The lamp body is sectioned into lamp chamber spaces corresponding to the respective lenses so that lamps having different functions can be integrated.

In the above vehicle lamp, a seal leg to be attached to the front opening portion of the lamp body is formed on the back surface side of a circumferential edge portion of the front lens, and the joint surface is formed in parallel with the direction in which the seal leg is extended. With a mold structure in which the mold is separated in the front/back direction of the extension of the seal leg, no undercut portion is produced in the front lens which is a molded product.

In the above vehicle lamp, the front lens which extends sideways from the front of a vehicle body is assembled into the front opening portion of the lamp body which opens sideways from the front of the vehicle body so that the lamp is attached to a corner portion of the vehicle body. The shape from the vehicle body to the front lens in the vicinity of the position of the corner portion of the vehicle body where the lamp is attached forms a smooth streamline shape along the vehicle body outline.

DETAILED DESCRIPTION OF PREFERRED EMBODIMENTS

Next, embodiments for carrying out the present invention will be described.

Figure 1:
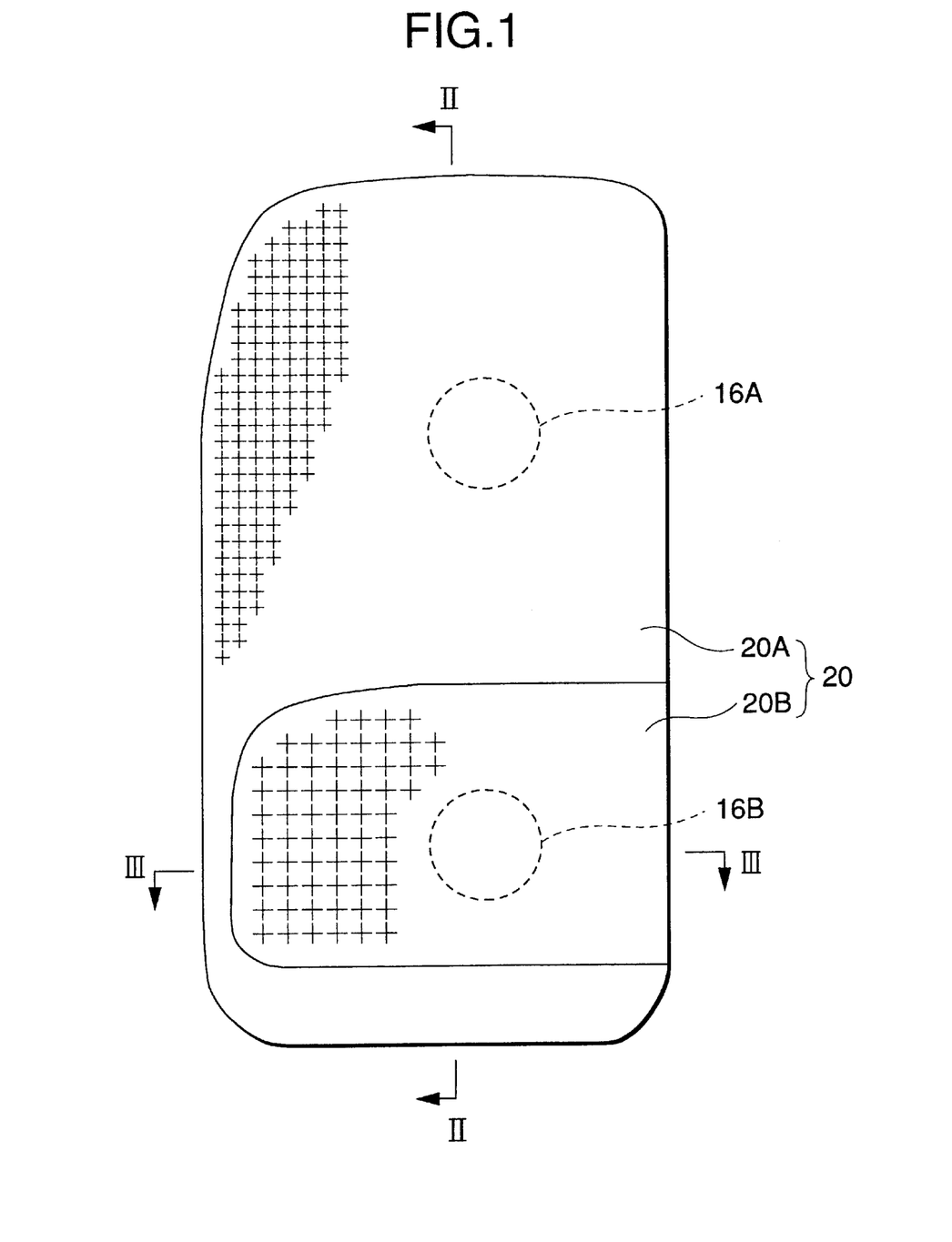
FIG. 1 is a front view of a rear combination lamp which is an embodiment of the present invention, and in which a tail and stop lamp and a turn signal lamp are integrated with each other.
Figure 2:
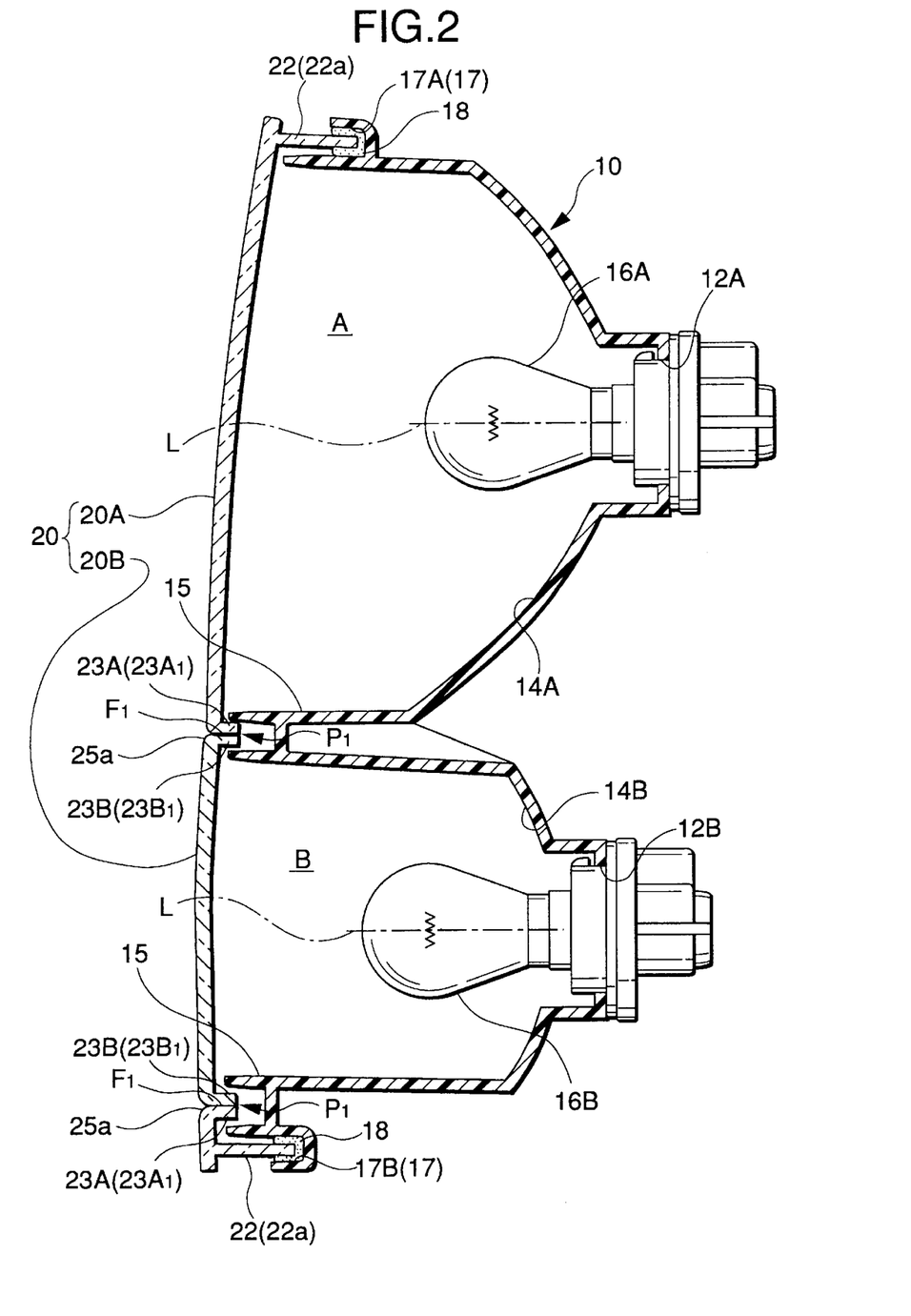
FIG. 2 is a vertical sectional view of the rear combination lamp (a sectional view taken on line II—II shown in FIG. 1.
Figure 3:
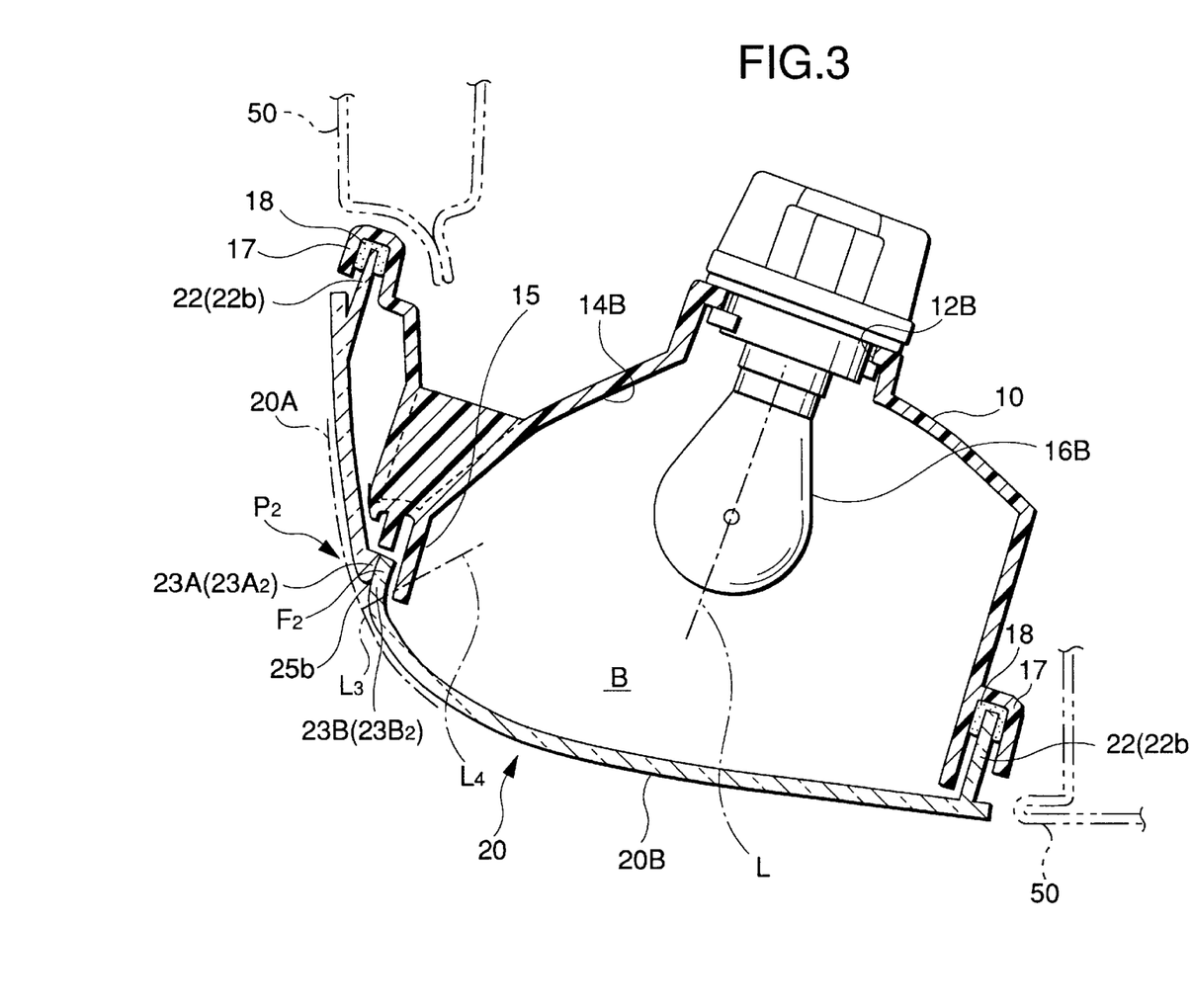
FIG. 3 is a horizontal sectional view of the rear combination lamp (a sectional view taken on line III—III shown in FIG. 1)

FIGS. 1 to 3 shows a rear combination lamp in which a tail and stop lamp and a turn signal lamp are integrally provided, and which is an embodiment of the present invention. FIG. 1 is a front view of the rear combination lamp. FIG. 2 is a vertical sectional view (sectional view taken on line II—II shown in FIG. 1) of the rear combination lamp. FIG. 3 is a horizontal sectional view (sectional view taken on line III—III shown in FIG. 1) of the rear combination lamp.

In these drawings, the reference numeral 10 represents a lamp body like a vessel which is longer vertically than horizontally and which is opened from the front to the left side (left side when the lamp is viewed from the front or this side). By a shade 15 extending in a U-shape turned sideways when viewed head-on, the inside of the lamp body 10 is sectioned into an upper lamp chamber space A for a tail and stop lamp and a lower lamp chamber space B for a turn signal lamp surrounded by the shade 15.

Parabolic reflectors 14A and 14B subjected to a reflection coating process are formed in the inner circumferential surface of the lamp body 10 corresponding to the lamp chamber spaces A and B. In the respective lamp chamber spaces A and B, there are disposed a white bulb 16A and an amber bulb 16B which are light sources inserted into bulb insertion holes 12A and 12B formed in lamp body rear top portions corresponding to the lamp chamber spaces, respectively.

A continuous seal groove 17 is provided around a front opening portion of the lamp body 10, and a seal leg 22 is provided circumferentially on the back surface of a front lens 20. The seal leg 22 is engaged with this seal groove 17, so that the lamp body 10 and the front lens 20 are integrated as a lamp. The reference numeral 18 represents a seal material with which the seal groove 17 is filled.

The front lens 20 is formed into an outward-convexly curved shape continued in its horizontal section to the outline of a vehicle 50 (see FIG. 3). The front lens 20 is constituted by a compound lens in which a red lens 20A for the tail and stop lamp having a size matching the whole of the front opening portion of the lamp body 10 including the lamp chamber space A, and a white lens 20B for the turn signal lamp having a size matching the lamp chamber space B are molded integrally such that their respective side edge portions 23A and 23B are made to abut on each other.

The front end portion of the shade 15 is formed into a shape which can block light travelling toward joint portions $P_1$ and $P_2$ between the red lens 20A and the white lens 20B, so that the areas of the front lens 20 corresponding to the lamp chamber spaces A and B emit light of the respective functional colors of the tail and stop lamp and the tail lamp without mixing red light of the former and amber light of the latter with each other.

A joint surface $F_1$ (see FIG. 2) between upper and lower sectionally hookshaped side edge portions $23A_1$ and $23B_1$ extended in the horizontal or left/right direction and constituting a joint portion $P_1$, in the vertical or up/down direction, of the red lens 20A and the white lens 20B is formed in parallel with upper and lower seal legs 22a extended in the horizontal or left/right direction in the upper portion and the lower portion of the front lens 20 so as not to form any undercut portion when the lens is molded. In addition, this joint portion is formed substantially perpendicularly to the front lens 20 (lenses 20A and 20B) formed in such a shape that its vertical section is substantially perpendicular to an optical axis L of the lamp (that is, formed in parallel with the optical axis L) so as not to make the lamp chamber spaces A and B narrow.

In addition, each front edge portion of the sectionally hook-shaped side edge portions $23A_1$ and $23B_1$ is fonned into a sectionally arc shape and extended to the joint surface $F_1$. Accordingly, a recess strip 25a extended sideways along the joint surface $F_1$ is formed in the joint portion between the side edge portions $23A_1$ and $23B_1$ so as to form a parting line between the red lens 20A and the white lens 20B.

On the other hand, sectionally hook-shaped side edge portions $23A_2$ and $23B_2$ (see FIG. 3) extended in the vertical or up/down direction and constituting a joint portion $P_2$ in the horizontal or left/right direction of the red lens 20A and the white lens 20B are formed in parallel with left and right seal legs 22b extended in the vertical or up/down direction in the left portion and the right portion of the front lens 20 so as not to form any undercut portion when the lens is molded. In addition, because the horizontal section of the front lens 20 is largely curved to form an outward convex, a joint surface $F_2$ between the side edge portions $23A_2$ and $23B_2$ is formed to be inclined with respect to a normal line $L_4$ of a lens surface line $L_3$ crossing the joint portion $P_2$(that is, formed in parallel with the optical axis L) so as not to make the lamp chamber space B narrow.

In addition, the joint portion $P_2$ in the horizontal or left/right direction is configured such that the acute hook-shaped side edge portion $23A_2$ on the lens 20A side where the joint surface $F_2$ and the lens surface line $L_3$ form an acute angle is joined with the obtuse hook-shaped side edge portion $23B_2$ on the lens 20B side where the joint surface $F_2$ and the lens surface line $L_3$ form an obtuse angle. Then, the acute front edge portion of the acute hook-shaped side edge portion $23A_2$ is chamfered in an arc shape substantially perpendicular to the joint surface of the obtuse hook-shaped side edge portion $23B_2$, so as to ensure tight contact of the joint surface $F_2$ between the side edge portions $23A_2$ and $23B_2$ so that no clearance is formed in the joint surface $F_2$ between the side edge portions $23A_2$ and $23B_2$ entirely.

That is, the front lens 20 is molded in such a manner that a white lens is molded in a condition that a portion of a mold with which the red lens 20A has been molded is replaced by another mold for molding a white lens (a compound lens in which the red lens 20A and the white lens 20B are integrated with each other is produced). In this case, since the acute front edge portion of the acute hook-shaped side edge portion $23A_2$ of the red lens 20A is chamfered to be substantially perpendicular to the joint surface $F_2$, the mold is surely charged with resin up to a portion corresponding to the front edge of the acute hook-shaped side edge portion $23A_2$ in the mold in the step of molding the red lens 20A.

Therefore, the acute hook-shaped side edge portion $23A_2$ is formed into a predetermined shape accurately and precisely. Accordingly, in the step of molding the white lens 20B with the red lens 20A inserted in the mold, the obtuse hook-shaped side edge portion $23B_2$ on the white lens 20B side is surely brought into tight contact with the acute hook-shaped side edge portion $23A_2$ of the red lens 20A so that the white lens 20B is molded integrally with the red lens 20A. Consequently, there is no fear that any gap is formed in the joint surface $F_2$ between the side edge portions $23A_2$ and $23B_2$.

Since the lenses 20A and 20B form a single continuous curved surface, a recess strip 25b extending vertically along the joint surface $F_2$ is formed in the joint portion $P_2$ between the side edge portions $23A_2$ and $23B_2$. However, the depth of the recess strip 25b is small, and the front edge portion of the side edge portion $23A_2$ has a smooth sectionally arc shape, so that there is no fear that the frictional resistance to the air is improved, and dust adheres to the joint portion.

In addition, the recess strip 25b is continued to the recess strip 25a provided along the joint surface $F_1$ extended in the horizontal or left/right direction so as to form a parting line between the red lens 20A and the white lens 20.

Although the above-mentioned embodiment has been described about a rear combination lamp in which a tail and stop lamp and a turn signal lamp are integrated with each other, and which has the front lens 20 in which the red lens 20A and the white lens 20B are molded integrally, the present invention is not limited to this case, but it is applicable to any other lamp having a front lens in which a plurality of lenses with different functional colors are molded integrally.

Further, even in the case where molding cannot be attained by a single mold because lenses to be formed are different in material though they are not different in color, the present invention is broadly applicable to a case of a lamp having a compound lens which is obtained by molding a second lens integrally with a first lens in a condition that the first lens which has been molded in one mold is inserted into another mold, a case of a lamp having a front lens constituted by a compound lens which is obtained by molding a third lens integrally with first and second lenses in a condition that the first and second lenses which have been integrally molded in one mold are moved into another mold, or the like.

As is apparent from the above description, according to a front lens for a vehicle lamp of the present invention, the tight contact in an inclined joint surface of a joint portion between lenses is ensured. Accordingly, not only the external appearance of the lamp is improved, but also the water-proofness in the joint portion is guaranteed.

Moreover, not only a lamp chamber is widen so that the heat radiation is superior, but also the diffusion angle of light is increased so that the visibility of the lamp is improved.

Furthermore, lamps having different functions are integrated to make the lamp compact. Accordingly, the space for receiving the lamps in a vehicle body can be reduced.

Still further, because the lamp has no undercut portion, the structure of a mold can be made simple. Accordingly, it is possible to reduce the manufacturing cost of a front lens, and hence the manufacturing cost of a lamp.

Still further, the front lens is formed into a streamline shape following the shape of a vehicle body. Accordingly, not only it is possible to reduce the frictional resistance of the vehicle body against the air around a lamp, but also it is possible to obtain a novel vehicle design.

What is claimed is:

1. A vehicle lamp comprising:

a light source;

a lamp body having a front opening portion thereof; and a front lens disposed in a front opening portion of the lamp body having a light source therein, wherein said front lens is a compound lens made from a plurality of lens bodies which are integrally formed by forming a joint between sectionally hook-shaped side edge portions of said lens bodies which are bent toward back surface sides of said respective lens bodies so that said compound lens has a continuous surface, a joint surface between said side edge portions being configured so as to be inclined with respect to a plane perpendicular to a lens surface line crossing a joint portion, said joint portion being constituted by an obtuse hook-shaped side edge portion in which said joint surface and said lens surface line form an obtuse angle therebetween, and an acute hook-shaped side edge portion in which said joint surface and said lens surface line form an acute angle therebetween, wherein an acute front edge portion of said acute hook-shaped side edge portion is chamfered substantially perpendicularly to said joint surface.

2. The vehicle lamp according to claim 1, wherein said lens surface line crossing said joint portion is an outward convexly curved line.

3. The vehicle lamp according to claim 1, wherein said front lens is constituted by a plurality of lens bodies different in color from each other.

4. The vehicle lamp according to claim 1, wherein a seal leg to be attached to said front opening portion of said lamp body is formed on the back surface side of a circumferential edge portion of said front lens, and said joint surface is formed in parallel with the direction in which said seal leg is extended.

5. The vehicle lamp according to claim 1, wherein said front lens which extends sideways from the front of a vehicle body is assembled into said front opening portion of said lamp body which opens sideways from the front of said vehicle body so that said lamp is attached to a corner portion of said vehicle body.

6. A front lens for a vehicle lamp disposed in a front opening portion of a lamp body having a light source therein, said front lens comprising:

a compound lens made from a plurality of lens bodies which are integrally formed by making joint between sectionally hook-shaped side edge portions which are bent toward the back surface sides of said respective lens bodies so that said compound lens has a continuous surface, a joint surface between said side edge portions being configured so as to be inclined with respect to a plane perpendicular to a lens surface line crossing a joint portion, said joint portion being constituted by an obtuse hook-shaped side edge portion in which said joint surface and said lens surface line form an obtuse angle therebetween, and an acute hook-shaped side edge portion in which said joint surface and said lens surface line form an acute angle therebetween, wherein an acute front edge portion of said acute hook-shaped side edge portion is chamfered substantially perpendicularly to said joint surface.

7. The front lens for a vehicle lamp according to claim 6, wherein said lens surface line crossing said joint portion is an outward convexly curved line.

8. The front lens for a vehicle lamp according to claim 6, wherein said front lens is constituted by a plurality of lens bodies different in color from each other.

9. The front lens for a vehicle lamp according to claim 6, wherein a seal leg to be attached to said front opening portion of said lamp body is formed on the back surface side of a circumferential edge portion of said front lens, and said joint surface is formed in parallel with the direction in which said seal leg is extended.

10. The front lens for a vehicle lamp according to claim 6, wherein said front lens which extends sideways from the front of a vehicle body is assembled into said front opening portion of said lamp body which opens sideways from the front of said vehicle body so that said lamp is attached to a corner portion of said vehicle body.

* * * * *

UNITED STATES PATENT AND TRADEMARK OFFICE
CERTIFICATE OF CORRECTION

PATENT NO. : 6,170,972 B1  Page 1 of 1
DATED : January 9, 2001
INVENTOR(S) : Fukuhara It is certified that error appears in the above-identified patent and that said Letters Patent is hereby corrected as shown below:

Claim 1,
Line 9, delete "of said lens bodies".

Claim 5,
Line 5, change "comer" to -- corner --.

Claim 10,
Line 6, change "comer" to -- corner --.

Signed and Sealed this

Second Day of April, 2002

Attest:

Attesting Officer

JAMES E. ROGAN
*Director of the United States Patent and Trademark Office*